(12) United States Patent
Morandi

(10) Patent No.: US 7,048,529 B2
(45) Date of Patent: May 23, 2006

(54) MOULD FOR CURVED PANELS

(75) Inventor: Maurizio Morandi, Turin (IT)

(73) Assignee: Metecno SpA, Tribiano (IT)

( * ) Notice: Subject to any disclaimer, the term of this patent is extended or adjusted under 35 U.S.C. 154(b) by 432 days.

(21) Appl. No.: 10/422,362

(22) Filed: Apr. 24, 2003

(65) Prior Publication Data

US 2004/0005373 A1  Jan. 8, 2004

Related U.S. Application Data

(63) Continuation of application No. PCT/IT01/00203, filed on Apr. 26, 2001.

(30) Foreign Application Priority Data

Oct. 25, 2000  (IT) ........................... MI2000A2305

(51) Int. Cl.
*B29C 33/30* (2006.01)
(52) U.S. Cl. ...................... 425/193; 249/155; 249/159; 425/195
(58) Field of Classification Search ................ 425/193, 425/195, 470, 123; 249/155, 159
See application file for complete search history.

(56) References Cited

U.S. PATENT DOCUMENTS

| | | | |
|---|---|---|---|
| 1,233,567 A * | 7/1917 | Furry | ........................... 249/194 |
| 3,618,886 A | 11/1971 | Phillip | |
| 4,619,433 A | 10/1986 | Maier | |
| 4,729,541 A * | 3/1988 | Maier | ........................... 249/159 |
| 5,029,803 A * | 7/1991 | Schworer | ..................... 249/179 |
| 5,040,965 A | 8/1991 | Baird | |
| 5,366,431 A | 11/1994 | Smith et al. | |
| 5,492,303 A * | 2/1996 | Jaruzel | ........................ 249/155 |
| 5,857,300 A * | 1/1999 | Gates | .......................... 249/210 |

FOREIGN PATENT DOCUMENTS

| | | |
|---|---|---|
| DE | 22 63 473 A | 7/1974 |
| DE | 35 16 536 C | 7/1986 |
| DE | 35 26 634 A | 2/1987 |
| DE | 44 08 100 A | 9/1995 |
| DE | 0 747 193 A | 12/1996 |
| FR | 2 279 905 A | 2/1976 |
| FR | 2 613 663 A | 10/1988 |
| FR | 2 698 648 A | 6/1994 |
| FR | 2 711 705 A | 5/1995 |
| WO | 86 02877 A | 5/1986 |

* cited by examiner

*Primary Examiner*—James P. Mackey
(74) *Attorney, Agent, or Firm*—Katten Muchin Rosenman LLP

(57) ABSTRACT

The invention relates to a mold for the manufacture of curved insulating panels, which comprises an upper half-mold (2) and a lower half-mold (3) opposite each other.

The structure of both said half-molds is formed by a respective chain of modular frames (5) hinged together and having a pyramidal or similar shape, which are connected at their tips by actuators.

These actuators, when they are operated, vary their length and cause the frames to rotate with respect to each other, thereby curving the surface of the half-molds acting on the panels to be manufactured.

In this way it is possible to produce panels with various radii of curvature using a single mold.

The invention also includes a press for use with the above-mentioned mold.

21 Claims, 8 Drawing Sheets

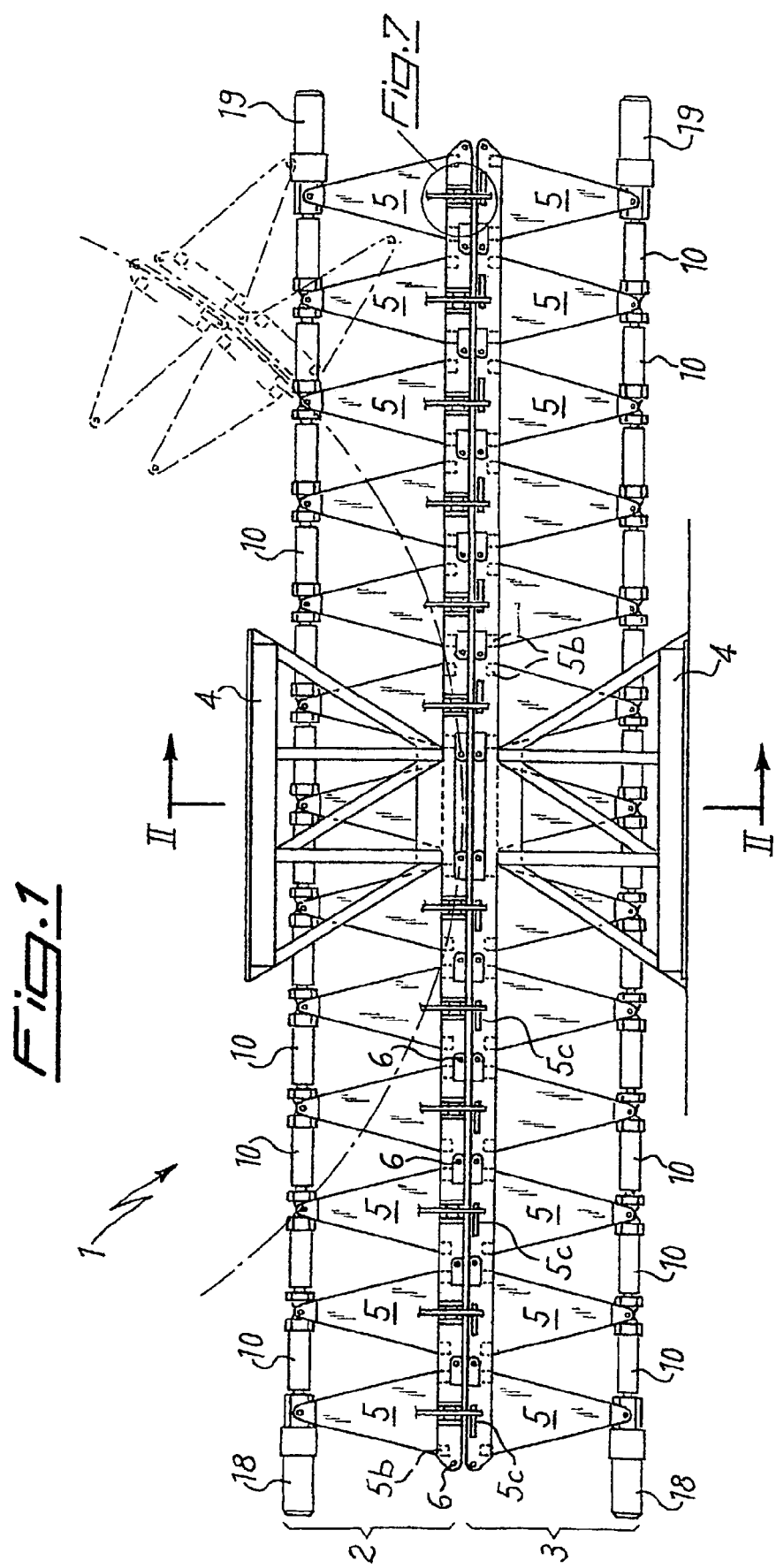

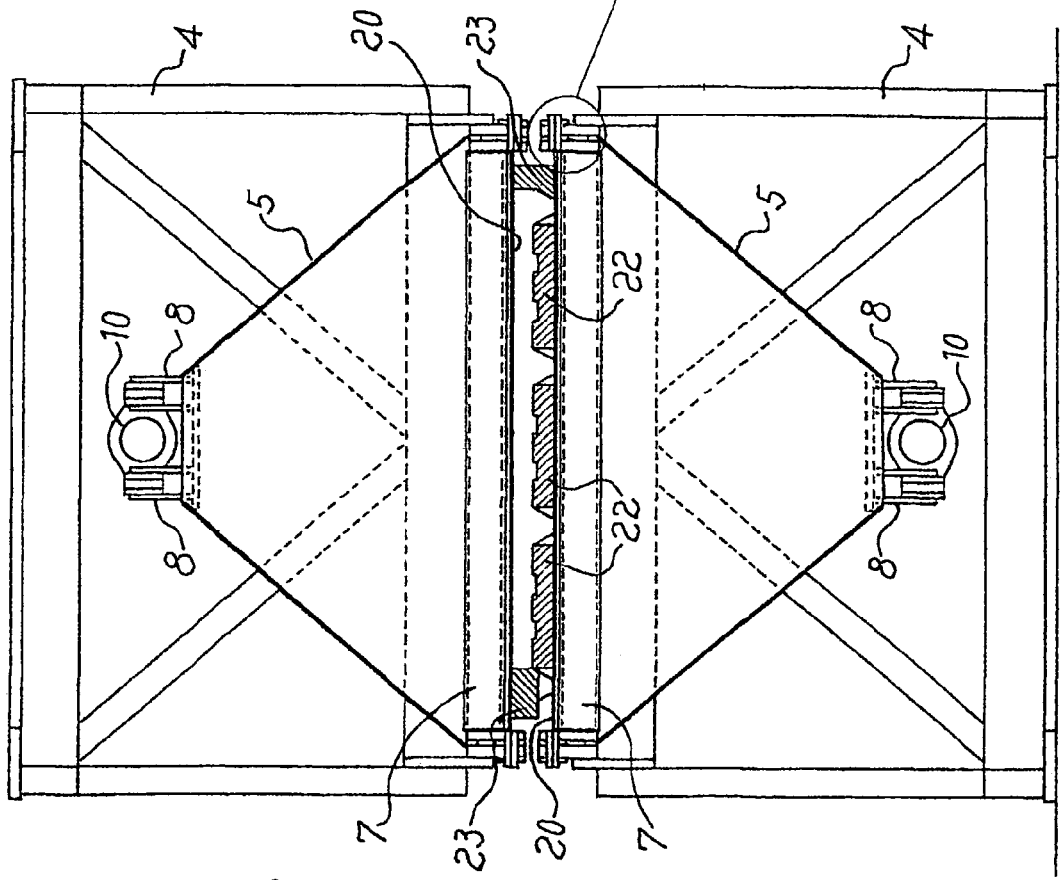
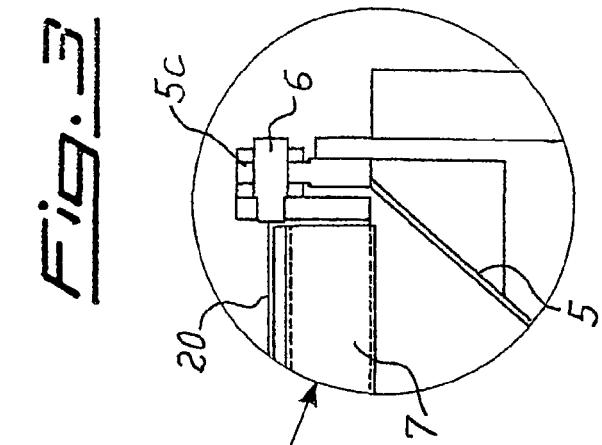

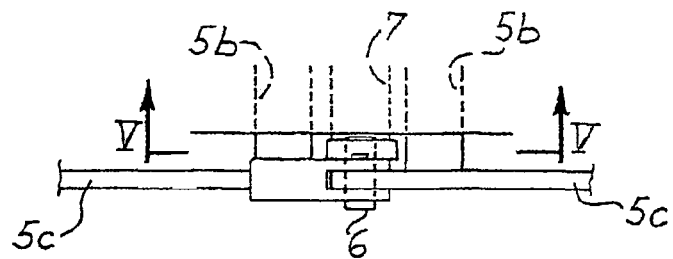
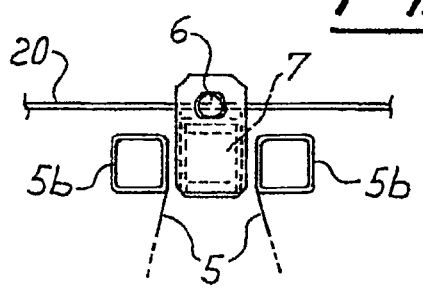
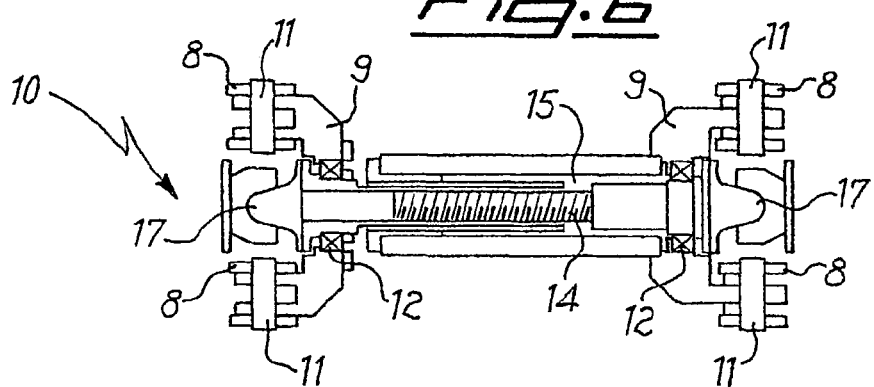
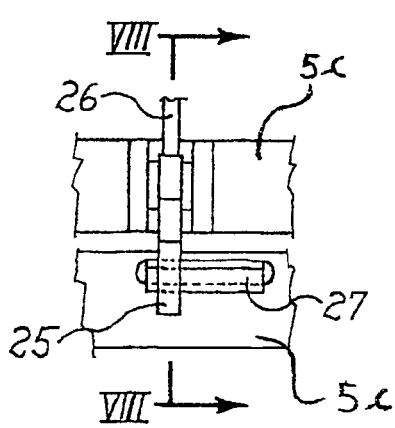
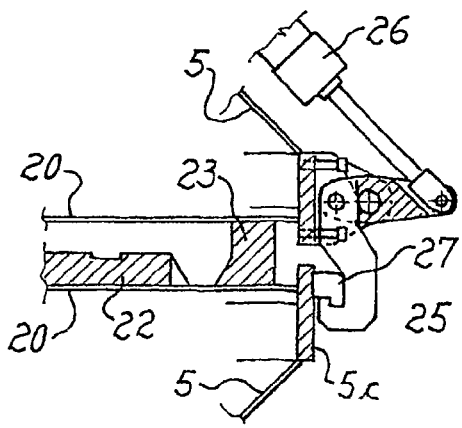

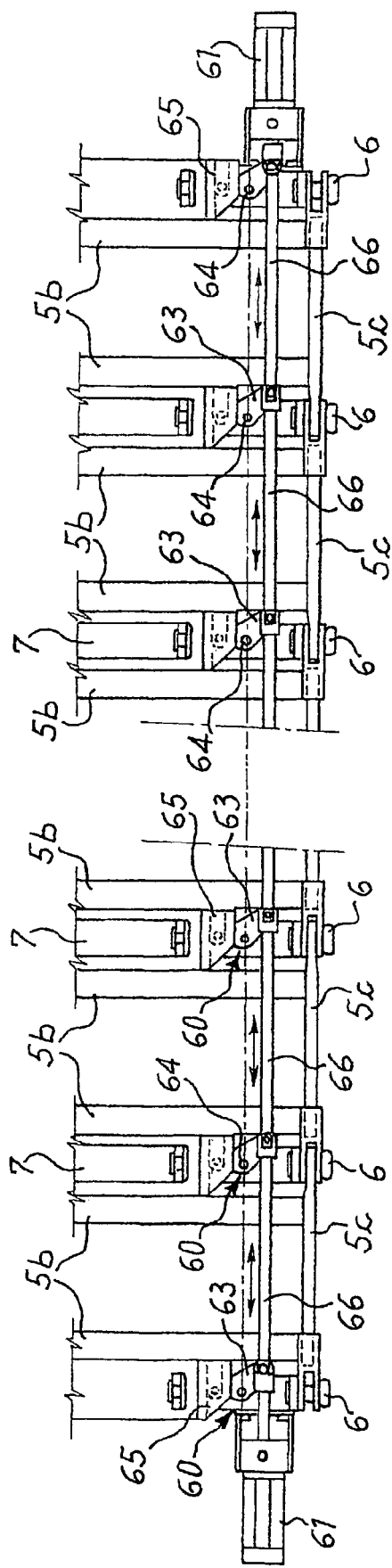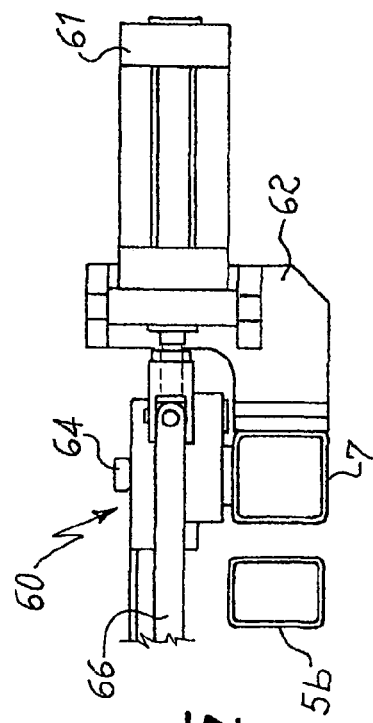

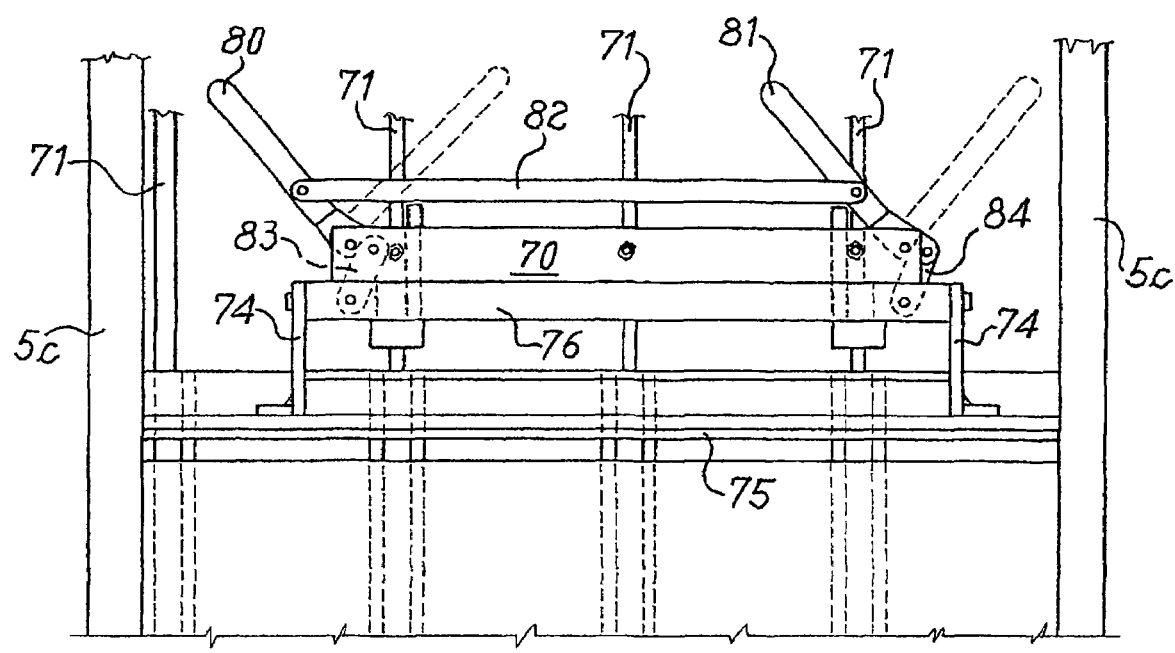
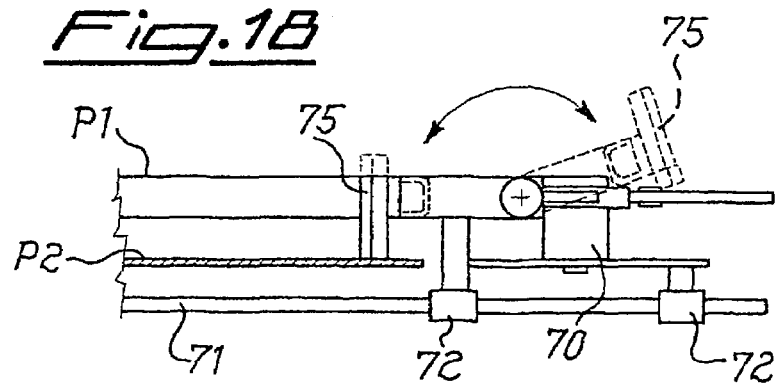

MOULD FOR CURVED PANELS

This application is a continuation of international application number PCT/IT01/00203, filed Apr. 26, 2001 and is still pending.

The present invention generally relates to the manufacture of insulating panels, of the type used in civil, industrial, mechanical constructions or other kinds thereof.

It is known that such panels usually have a composite multilayer structure, in which there is at least one layer of insulating material located between two walls; these walls may be laminar or also thick, while the insulating material is usually a polyurethane foam.

The manufacture of these panels is performed with moulds where the walls are held in opposed positions at a predetermined distance, so as to inject subsequently the insulating foam between them; this applies to both flat panels and curved panels, i.e. arch-shaped panels used in roofing for buildings, cambered structures or other applications.

However, the manufacture of curved panels requires some technical measures which it more complex than the manufacture of flat panels.

Indeed, in order to inject the foam between the walls, which are obviously curved with the radius necessary to obtain the final panel, the walls are supported in respective half-moulds whose supporting surface is shaped with the same form.

This means that for producing series of panels with different radii of curvature, it is necessary to use moulds (i.e. pairs of half-moulds) with corresponding radii: consequently this manufacturing process requires a large moulding equipment and is therefore rather onerous under the costs point of view.

On the other hand it is evident that in order to limit the costs, it would be necessary to reduce the variety of panels produced so that, in any case, the current situation can certainly not be regarded as optimum.

The technical problem underlying the present invention is therefore that of remedying this state of the art.

The invention thus aims at achieving the manufacture of panels according to several curvatures, avoiding the problems arising from the excessive number of moulds which nowadays are necessary for this manufacture.

The idea for solving such problem is that of providing a mould with a configuration which can be varied according to the manufacturing needs; in this way, indeed, with a single mould it is possible to manufacture panels of any radius of curvature, thereby overcoming the abovementioned problems.

According to the invention, such a mould comprises two half-moulds formed by respective articulated chains of modular frames hinged together; said frames can be rotated with respect to each other about their mutual hinging axis, so as to vary the curvature of the profile of the half-moulds according to the panels to be manufactured.

The characterising features of the mould of this invention are set out in the claims accompanying this description.

It should however be added that in a preferred embodiment, the mould can be used with an appropriate press, whose features are also indicated in the following claims.

The invention as a whole will result more clearly from the description given hereinafter, relating to a preferred and non-exclusive embodiment thereof shown in the attached drawings in which:

FIG. 1 is a general view of a mould according to the invention;

FIG. 2 is a cross-sectional view along the line I—I of FIG. 1;

FIG. 3 is an enlarged view of a detail of the mould in FIG. 2;

FIG. 4 shows a top view of the detail in FIG. 3;

FIG. 5 is a cross-sectional view along the line V—V of FIG. 4;

FIG. 6 shows, in partial cross-section, one of the actuators present in the mould of the preceding figures;

FIG. 7 is an enlarged view of a detail of FIG. 1;

FIG. 8 is a cross-section along the line VIII—VIII in FIG. 7;

FIG. 15 is a top view of a part of the mould in FIG. 14;

FIG. 16 is a side view of a detail of FIG. 15;

FIGS. 17 and 18 show, respectively from above and the side, a buffer device for the end sections of the panels in the mould according to the invention.

Figure 9:
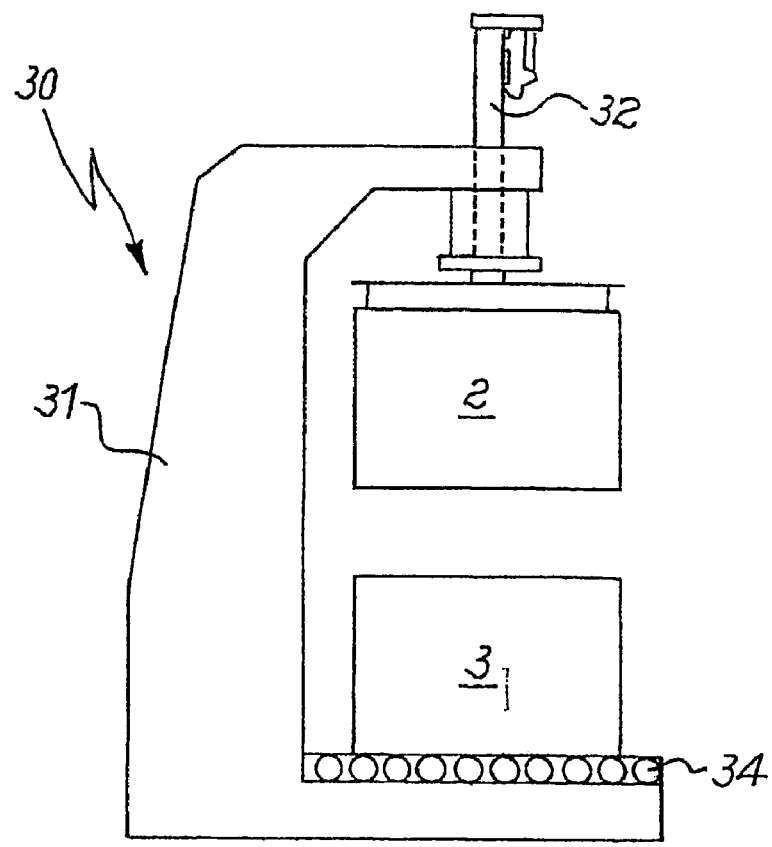
FIGS. 9 and 10 are, respectively, a front and a top view of a press for use with the mould of FIGS. 1 to 8.

With reference to the drawings, the first figure shows a mould according to the invention for the manufacture of insulating panels, generally referred to by 1.

This mould comprises an upper half-mould 2 and a corresponding lower half-mould 3; for the sake of brevity, hereinafter reference will be made, where not otherwise specified, to only one of said half-moulds since what will be stated below is also applicable to the other half-mould, with any appropriate adaptations due to their mutual position (one above and the other below).

Each half-mould 2, 3 is provided with rigid support beams 4 which servs for movement thereof during the various stages of the production cycle, as will be better seen hereinafter.

The beams 4 support a plurality of mutually hinged modular frames 5 which form an articulated chain of variable configuration.

More specifically, each frame 5 has a substantially pyramidal form which extends upwards from a quadrilateral base formed by two cross-pieces 5b (made from normal metallic sections) and two longitudinal members 5c (see FIGS. 2–5).

The longitudinal members 5c of two consecutive frames are hinged by means of pins 6 (one of which is shown in FIG. 4), in such a way as to allow rotary movements one with respect to the other; a spacer 7, similar to the sections which constitute the cross-pieces 5b, is also mounted between said pins.

On the tip of each pyramidal frame 5 there is a pair of brackets 8, intended for the assembly of the fork members 9 of telescopic actuators 10 which operate the movements of the frames 5.

For this purpose, as can be seen from the drawings (FIGS. 1 and 6), each fork member is connected to the associated brackets 8 by means of pins 11, in such a way as to allow relative rotations between the actuators 10 and the frames 5; furthermore, in this example rolling bearings 12 are mounted in the fork members 9 for rotatably supporting a threaded shaft 14.

Said shaft is arranged inside an internally threaded coaxial sleeve 15 to form therewith a telescopic system suitable for varying the overall length of the actuator 10 between the fork members 9 thereof, following the rotations of the shaft 14.

For this purpose the ends of each shaft 14 are connected to those of the shafts of adjacent actuators, by means of universal joints 17; the kinematic chain thus formed is made to rotate by a pair of motors 18 and 19, which are located at the opposite ends thereof (see FIG. 1).

The base of the modular frames 5 is the part thereof directed towards the panel to be processed during the foam injection step; in order to make the contact of the half-moulds 2 and 3 with the panel more uniform, said half-moulds are preferably provided with a retaining surface 20 located on the bases of the frames 5.

This surface must be flexible so as to be able to adapt its shape to the various curved configurations which the mould can assume; for this purpose said surface can be formed by a metal sheet or a series of elements such as shims, staves or others, connected together in a hinged manner (for instance likewise the slats of a common window blind), thereby forming a surface suitable to fit with the curved profile of the half-mould.

The aforementioned elements can be made of any suitable material, for example metallic like aluminium or steel, or plastic, wood, rubber or others.

The retaining surface 20 is supported on the associated half-mould so as to slide with respect to the modular frames 5, when said frames rotate for obtaining the desired curvature of the half-mould.

Furthermore, jacks or other equivalent means, might be provided for acting on the surface 20 in a intermediate position between the spacers 7, so as to reduce the polygonal effect imparted thereto by simple contact with said spacers 7.

In addition to the abovementioned purposes, the retaining surface 20 is also useful for mounting optional supports for the fretted sheets which form the walls of the panels to be produced, referred to as 22 in FIG. 2, or longitudinal sidewalls 23 which laterally delimit said panels; both the supports and the sidewalls can be formed using single strips of flexible material (such as rubber or the like) having the same length of the mould, or using separate slats of semi-rigid materials such as wood and other materials.

It should nonetheless be pointed out that the supports 22 may also be dispensed with if the sheets which form the walls of the panel to be produced have such a rigidity that they do not deform under the thrust resulting from the injection pressure of the foam. Likewise, the lateral sidewalls 23 are also superfluous where the panels to be produced have the same width as the mould and the sheets of the walls are folded along their edges.

Last it should be observed that according to a preferred embodiment of the invention, the whole mould 1 is designed to not transmit stresses towards the outside during the injection of the foam.

This result is made possible by the fact that in the operating condition, i.e. that when the foam is injected, the half-moulds 2 and 3 are held against each other by a series of locking hooks 25 actuated by respective hydraulic or pneumatic jacks 26.

Said hooks, which in the drawings (see FIGS. 1, 7 and 8) are visible on the outside of the upper half-mould 2, are engaged in corresponding stepped elements 27 projecting laterally from the lower half-mould 3, in such a way as to compensate for the separating forces generated by the pressure of the injected foam.

In this manner the whole mould does transmit separating forces to the press where it is used, which thus serves basically only to support the weight of the mould and therefore can be manufactured lighter than those normally used in the known art.

The closing system formed by the hooks 25 and the stepped elements 27 also has the advantage of adapting well to the curvature variations of the half-moulds.

Indeed, as can be seen from the drawings the stepped elements are parallel to the longitudinal members 5c of each frame 5 and therefore the hooks 25 engaging therewith allow adjustable positioning, so as to facilitate the mutual displacements which occur following the variation in curvature of the half-moulds.

Figure 10:
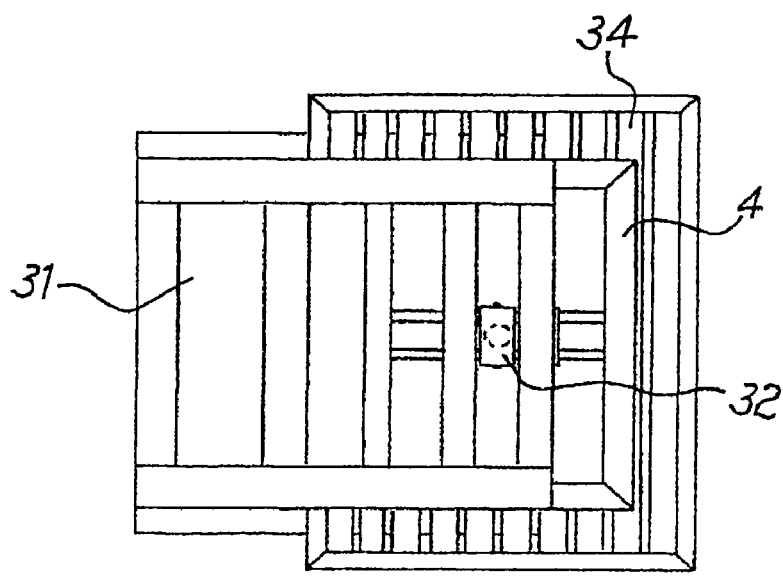

As mentioned above, the mutual locking of the half-moulds 2 and 3 prevents the transmission of forces outside of the mould during injection, thereby allowing the use of less sturdy presses than traditional ones, like that shown in FIGS. 9 and 10.

This press has been denoted in its entirety by 30 and consists of a load-bearing structure 31, at the top of which there is a hydraulic cylinder 32, which serves to move the upper half-mould 2 (shown only in schematic form in FIGS. 9 and 10) during the various manufacturing steps.

The movement of the lower half-mould 3 occurs, instead, by causing it to slide on a motorised rollerway 34, provided below on the load-bearing structure 31.

The press thus configured is also supplied, of course, with all the means necessary for injection of the foam in the panels, which being of the type already known per se are not taken further into consideration here.

Functioning of the mould 1 according to the invention, will now be described in relation to the various stages of its operating cycle.

In order to proceed with the foam injection step it is first necessary to configure the upper and lower half-moulds 2 and 3 according to the curvatures of the walls of the panels to be produced; in this respect it should be considered that the walls of the panels will generally have slightly different radii of curvature: i.e. smaller that of the wall located on the intrados of the panel and larger that of the wall on the extrados.

In order to curve half-moulds 2 and 3, the respective pairs of motors 18, 19 are activated thereby operating the kinematic chains formed by the threaded shafts 14 of the actuators 10.

More specifically, the shafts 14 in the upper half-mould 2 are rotated in a direction (clockwise or anticlockwise, as required) such as to reduce the distance between the fork members 9 of the associated actuators 10; vice versa, in the lower half-mould 3 the rotation of the shafts 14 imparted by the motors 18 and 19 occurs in the opposite direction, in such a way as to increase the abovementioned distance.

As a consequence, the pyramidal frames 5 of the upper half-mould 2 carry out a rotation with respect to the mutual hinging pins 6, in such a way as to cause the whole half-mould to assume an curved configuration.

For better understanding this fact, in FIG. 1 the profile of the retaining surface 20 associated with the upper half-mould is indicated by a curved broken line, when the latter is in the convex condition reached following activation of the motors 8 and 9; said condition is reached starting from the initial straight position also visible in FIG. 1.

On the right of said figure a pair of pyramidal frames 5 are also shown in broken lines, in the position assumed following the curvature of the half-mould 2.

An equal and opposite situation exists in the lower half-mould 3, where the mutual rotation of the frames 5 occurs in an opposite direction to that of the upper frames;

therefore the telescopic actuators 10 extend, causing the half-mould 3 to assume the required concave configuration.

In FIG. 1 the outline of two frames 5 of the lower half-mould 3 is shown (in broken lines), in the position assumed when it is curved in a manner corresponding to that of the upper half-mould 2.

In this operating position, by keeping separated the two half-moulds on the press 30, it is possible to apply the extrados curved wall of a panel to be produced on the lower half-mould 3; the intrados curved wall is then placed above it and the mould is closed.

For this purpose the upper half-mould 2 is lowered by the oil-hydraulic cylinder 32 of the press 30 towards the lower half-mould 3, thereby allowing the mutual locking thereof by means of engagement of the hooks 25 in the respective stepped elements 27.

The polyurethane foam is then injected like in traditional processes and at the end of this operation the mould is opened after having released the engagement of the closing hooks 25.

The upper half-mould 2 is then raised by the hydraulic cylinder 32, while the lower half-mould 3 is moved away along the rollerway 34.

A new lower half-mould on which the curved walls of the next panel have already been arranged, can then be brought into position on the press 30, thereby initiating the production of said panel.

It is not difficult to understand that these operations are advantageously facilitated by the rollerway 34, which allows the lower half-mould to be moved quickly during both loading and unloading of the press.

Such a manufacturing process allows to reduce waste of time during the production cycle since the injection step for a panel occurs at the same time as the off-line preparation of another half-mould, with the walls of the subsequent panel to be produced.

It must however be pointed out that in addition to the time reduction associated with the operation described above, the mould according to the invention also allows to achieve other important results.

Indeed, as can be understood from the explanation given before, during the working cycle there are no operating steps like the removal of a finished panel or the positioning of the walls for the production of the following panel, which are performed when the half-moulds are located on the press.

This facilitates the execution of such operations which are generally performed manually by press operators and therefore require a certain amount of space for the necessary movements.

For this purpose in the known presses the lower half-mould is fixed and the upper half-mould must be raised with respect thereto, by a suitable distance; this requires a wide lifting movement which inevitably increases the complexity of the press.

With the present invention, on the contrary, lifting the upper half-mould 2 must only be sufficient to allow movement in the transverse direction, of the lower half-mould 3 along the rollerway 34, since, owing to the use of two (or more) lower half-moulds, no manual intervention is required while said half-moulds are in the press.

Obviously, several changes in the invention are possible with respect to the embodiment thereof described hitherto, said changes concerning the various parts which constitute the mould 1. For example, the retaining surface 20 (as well as the supports 22 and the sidewalls 23 mentioned above) may not be necessary in certain applications; indeed, as described above, said surface has the function of ensuring more uniform contact between each half-mould and the wall of the panel on which it acts.

However, there may be cases where the surface is absent and the sheet rests directly on the spacers 7 or, more generally, on the modular frames 5; a situation of this kind could occur, for example, when the frames have such dimensions that the distance between the points on which the surface 20 rests is rather small, so as to allow a satisfactory contact between the frames and the panel without the need to arrange the retaining surface 20 there between.

Further important changes are also possible as regards the form of the frames 5.

Indeed, from the explanations given above it can be appreciated how the frames have the function of conferring the necessary rigidity to the respective half-mould in order to perform the foam injection correctly, and must be able to rotate mutually with respect to each other for varying the radius of curvature of the half-moulds. Within the scope of this general teaching it is nonetheless evident that persons skilled in the art may develop forms alternative to the pyramidal one considered in the example above, thereby obtaining the same effects.

In this context it may be useful to mention that the bases of the mutually hinged frames 5 form a flexible articulated system which is substantially similar to a transmission chain like that of a bicycle (Galle's chain) or other.

The part of the frames which extends upwards from the bases, i.e. the lateral surface of the pyramid in the example described, has basically only the function of allowing to mount the means (actuators 10) performing rotation of the bases and to transmit the force which said means exert, from one frame to another.

Figure 11:
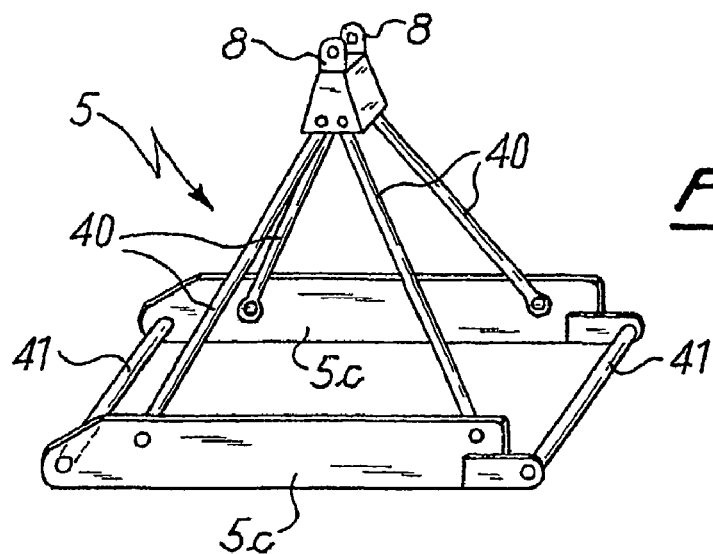
FIGS. 11, 12 and 13 show respective variants of modular frames for the mould according to the invention.
Figure 12:
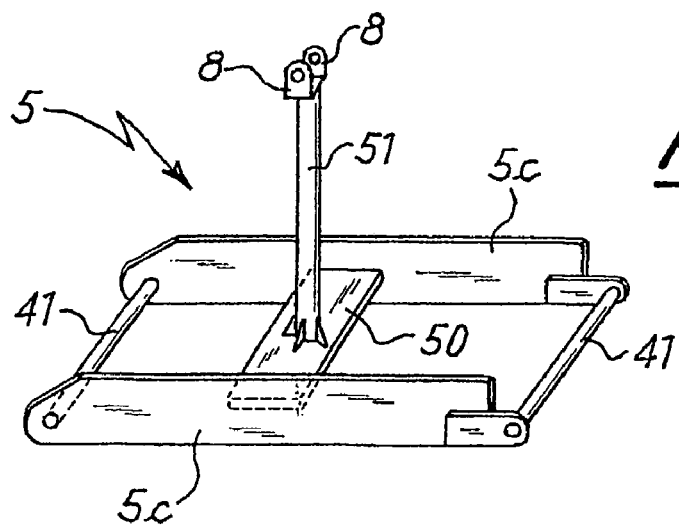
Figure 13:
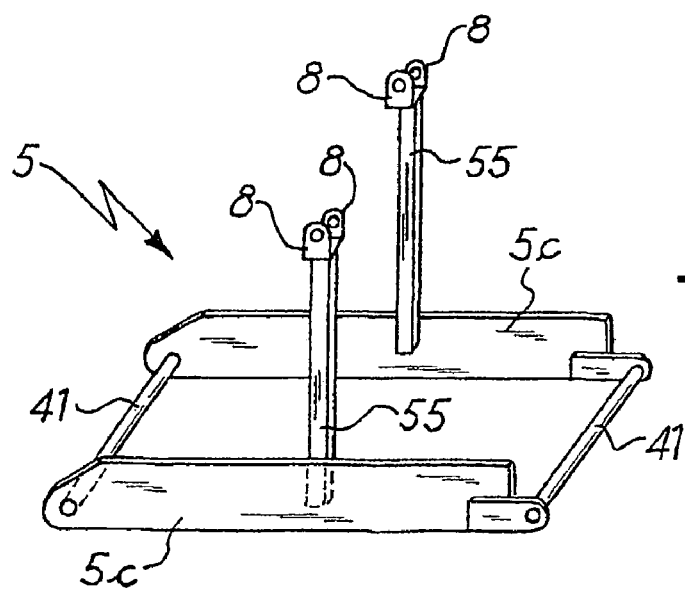

On the basis of these considerations it can therefore be understood that any frame configuration suitable for achieving these desired functions may be used; in FIGS. 11, 12 and 13 some possible embodiments of frames are shown, where the elements structurally or functionally equivalent to those already seen have retained the same numbering.

As can be seen, in the first of these alternatives (FIG. 11) the pyramidal form is obtained with a reticular structure made of bolted rods 40, extended from the longitudinal members 5c.

In order to lighten the structure, said longitudinal members are joined in a transverse direction only by pins 41 which are also used for hinging the frames; however, crosspieces and spacers like those denoted by 5b and 7 in the first example described, with hinging pins 6, could also be provided.

In the case of FIG. 11, the pins 41 have the same function as those present in common bicycle chains, while the brackets 8 for mounting the telescopic actuators 10 are arranged at the tip of the frame, in a manner similar to that already seen.

In the second frame variant shown in FIG. 12, a crosspiece 50 on which a column 51 is fixed, is present in a central position between the two longitudinal members 5c: brackets 8 for the actuators 10 are provided at the end of said column.

In both variants considered above the mounting point of the actuators is central with respect to the frames, likewise in the case of the pyramidal frame described initially; this allows a single chain of actuators to be used in order to modify the curvature of each half-mould 2 and 3.

However, this solution could be replaced by another one where the actuators are arranged on the sides of the hinged frames; for this purpose reference can be made to FIG. 13, where an example of frame according to such an alternative is shown.

As can be seen, in this case the frame 5 comprises two uprights 55, each of which is fixed to a respective longitudinal member 5c and supports at its free end the brackets 8 intended for mounting of the telescopic actuators 10; it can be appreciated that in this manner there will be two actuators acting between one frame and another, arranged parallel along the sides thereof.

Obviously in this case for each half-mould there will be two parallel chains of actuators (similar to the chain in FIG. 1), extending in a lateral position instead that in the middle.

In this respect it is important to note how the telescopic actuators 10, which in the above example are of the electromechanical type, can be replaced with other means suitable for performing the same functions.

The actuators and the kinematic system formed therewith have indeed the function of imparting the necessary rotations to the frames 5, in order to configure the half-moulds with the desired curvature; they must also hold the frames in the rotated position corresponding to said curvature.

In the light of the foregoing, nothing would prevent the use of hydraulic or pneumatic actuators comprising, for example, telescopic pistons, hydraulic cylinders and the like, in the place of the electromechanical actuators with threaded shafts 14; it should be noted that in these cases it would be possible to eliminate the complicated coupling system comprising universal joints 17 for rotation of the threaded shafts 14, described in the preceding example.

As a further addition to what has been said heretofore, it must be pointed out that the half-moulds 2 and 3 can also be provided with adapter means for the processing of panels with smaller dimensions than said half-moulds.

Figure 14:
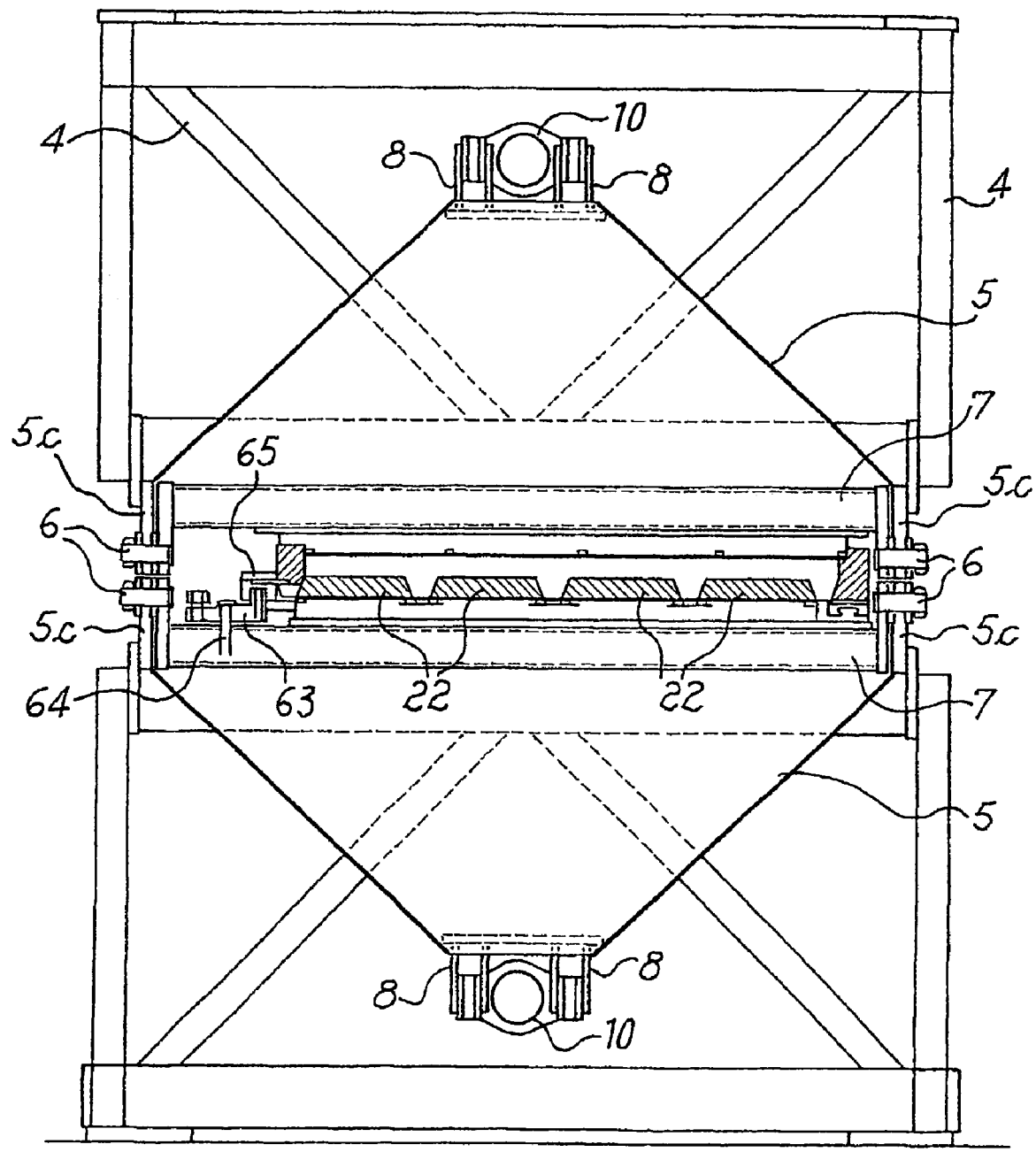
FIG. 14 shows a cross-section of a variant of the mould in FIGS. 1 and 2.

In particular, one of the two retaining longitudinal sidewalls 23 of the variation of the invention shown in FIGS. 14, 15 and 16, (the left sidewall in FIG. 14) can be adjusted, so that panels of different widths may be handled.

For this purpose displacement mechanisms 60 are mounted on the spacers 7 in the region of the hinging pins 6 of the frames 5, said mechanisms being connected together so as to form a chain actuated by a pair of motors 61, likewise it has been seen above for the actuators 10. In this case the motors are rigidly fixed to the two end spacers 7 of the lower half-mould, by means of a clamp 62 (FIG. 16).

Each mechanism 60 is formed essentially by a lever 63 which oscillates with respect to a pin 64 fixed on the spacer 7, and has at one end a sliding block 65 that moves the retaining sidewall 23 of the panel to be processed, while it is connected at its other end to a driving extension 66.

The latter is fixed to the lever in an articulated manner (see FIG. 16) so as to comply with the changes in configuration of the mould and is in turn connected to the adjacent extension thereby forming, together with the other extensions, a drive chain actuated by the hydraulic cylinders 61.

Such cylinders move the chain of extensions 66 to the right or to the left as indicated by the double arrows in FIG. 15, thereby causing the levers 63 actuated by them to oscillate simultaneously and consequently varying the position of the sliding blocks 65 connected thereto: this allows the sidewall 23 which is integral to the sliding blocks, to be moved transversely and consequently the mould to be adapted to the width of the panels to be processed in each case.

Also as regards the different lengths which the panels to be manufactured may have, it is possible to provide systems capable of adapting the moulds thereto.

An example of a device intended for this purpose is shown in FIGS. 17 and 18; in particular said device has the function of sealing the outer and inner walls of the panel at their ends, which have been prepared on the mould prior to injection.

For this purpose, the device comprises a slide 70 sliding along guides 71 which are arranged longitudinally on one (or both) of the end frames 5 of the lower half-mould 3 and on which it rests by means of slids 72.

Two oscillating arms 74, supporting a buffer head 75, are pivotably mounted on the slide 70 (as shown in FIG. 18): this head is therefore movable between a rear non-operative position (shown in broken lines in FIG. 18) and an advanced operative position in which it is arranged transversely with respect to the upper wall $P_1$ and lower wall $P_2$ of the panel to be manufactured, accomodated in the mould.

In particular, according to a preferred embodiment, the lower wall $P_2$ is a few centimeters (approximately 10 cm) longer than the upper wall $P_1$ and the head 75, in the advanced position, rests on the projecting portion of the lower wall.

This is made possible by the oscillating movement of the head 75 supported by the oscillating arms 74, because the head can then come to rest without interfering with the projecting portion of the lower wall $P_2$.

In addition, for an improved contact between the head 75 and the upper wall $P_1$, the oscillating arms 74 are pivotably mounted on a cross-piece 76 moved by a lever system 80, 81, 82, 83, 84 provided on the slide 70.

The lever system 80–84 allows the head 75 to be kept pressed against the wall $P_1$, by displacing the former towards the latter following the rotation of the levers 80 (as shown in broken lines in FIG. 17); said levers are actuated manually during the preparation of the mould prior to injection.

In practice, the movement imparted by the lever system 80–84 to the cross-piece 76 has the function of taking up play, after the slide 70 has been positioned along the guides 70 and the head 75 has been brought into the advanced operating position.

Last, it should be finally added that although the mould according to the invention has been designed for the manufacture of curved panels, it could also be used for the manufacture of flat panels given its functional versatility; for this purpose it is sufficient to use it in the linear configuration shown in FIG. 1.

Moreover, it should be mentioned that said mould can also be used to produce panels different from the insulating panels considered above.

Indeed, in the light of the functional features previously described it is possible to consider using the mould of the invention, not only for the injection of foam in insulating panels but also for other operations such as gluing of their layers, or heat-welding in general and other operations.

More generally, the functional principle of the mould according to the invention allows to face the problems relating to the curvature of the panels, involved in other manufacturing processes different from the foam injection.

It is clear that in these cases it is possible to introduce further variations for adapting the mould to the different applications, which nonetheless fall within the scope of the teaching provided by the invention.

For example there may be situations wherein a pressure like that induced by injection of the foam, is absent; consequently in these cases it is possible for the two half-moulds not to be held together with locking means such as hooks 25 and stepped elements 27, since it is not required to offset any separating force.

All these and other possible variations fall within the scope of the following claims.

The invention claimed is:

1. Mould for panel manufacturing, comprising an upper half-mould (2) and a lower half-mould (3) to be coupled with each other for accommodating between them a processed panel, characterized in that each half-mould comprises a respective articulated chain of modular frames (5) hinged together, means (10) for operating the relative rotation between a frame and the adjacent one about their hinging axis (6) thereby varying the curvature of the half-mould, said means being connected to each other so as to form a kinematic chain operated by driving means (18, 19) located at an end thereof.

2. Mould according to claim 1, wherein the modular frames (5) comprise a substantially polygonal base (5b, 5c, 6, 7, 41) hinged to the base of an adjacent frame to form said articulated chain, which base forms the part of each frame directed towards a panel accommodated between the half-moulds (2, 3).

3. Mould according to claim 2, wherein the modular frames (5) comprise an least one respective element (8, 40, 51, 55) which extends from said base (5b, 5c, 6, 7, 41), on the face thereof opposite to that directed towards the panel accommodated between the half-moulds (2, 3), and wherein said means (10) for operating the relative rotation of the frames operates on said element.

4. Mould according to claim 3, wherein the means for operating relative rotation of the frames (5) comprises actuators (10) of variable length, which act between said respective elements extending from the bases (5b, 5c, 6, 7, 41) of the frames.

5. Mould according to claim 4, wherein the frames (5) have a substantially pyramidal form and the actuators (10) are fixed between the tips of these pyramids.

6. Mould according to claim 4, wherein the frames (5) comprise respective columns (51) which extend upwards centrally from the base thereof (5b, 5c, 6, 7, 41) and the actuators (10) are fixed to the ends of these columns.

7. Mould according to claim 4, wherein the frames (5) comprise respective pairs of uprights (55) which extend upwards from longitudinal members (5c) arranged along the sides of the bases (5b, 5c, 6, 7, 41) and the actuators (10) are fixed to the ends (8) of the uprights of adjacent frames.

8. Mould according to claim 4, wherein the actuators are of the hydraulic or mechanical type.

9. Mould according to claim 8, wherein the actuators (10) of the mechanical type comprise a threaded shaft (14) coupled with a sleeve (15) so that the length of the actuator varies following the relative rotations of the former with respect to the latter, and wherein the shafts of the actuators are connected together in series with universal joints (17) in such a way as to form a kinematic chain driven by at least one motor (18, 19) located at one of its ends.

10. Mould according to claim 1, comprising a flexible retaining surface (20) arranged along the profile of the half-moulds (2, 3) on the bases (5b, 5c, 6, 7, 41) of the modular frames (5).

11. Mould according to claim 10, wherein said retaining surface (20) is formed using elements such as shims, staves or the like, connected together in a hinged manner and made of metal, plastic, wood or other material.

12. Mould according to claim 10, wherein said retaining surface (20) is made of sheet metal.

13. Mould according to claim 1, comprising means (25, 26, 27) for keeping the half-moulds (2, 3) locked against each other.

14. Mould according to claim 13, wherein the means for keeping the half-moulds (2, 3) locked comprises hooks (25) arranged laterally on the upper half-mould (2) and directed downwards and which engage in corresponding lateral stepped elements (27) on the lower half-mould (3), extending in the longitudinal direction on each frame (5) between its hinging axes with the adjacent frames.

15. Mould according to claim 1, wherein the half-moulds (2, 3) are provided with respective rigid beams (4) for supporting the chains of modular frames (5).

16. Mould according to claim 1, comprising a buffer sidewall (23) which extends in longitudinal direction with respect to one of the half-moulds (2, 3) and can be adjusted so as to provide the lateral retention of panels having different width.

17. Mould according to claim 16, wherein mechanisms (60) for displacing said longitudinal sidewall (23) are present along the hinging axis of the modular frames (5) of the lower half-mould (3), said mechanisms being driven by extensions (66) connected together in articulated manner so as to form a kinematic chain which can be actuated by at least one motor (61) located at the end of the lower half-mould.

18. Mould according to claim 17, wherein said mechanisms (60) comprise an oscillating lever (63) having one end connected to the associated driving extension (66) and the opposite end acting on the sidewall (23) to be displaced.

19. Mould according to claim 1, comprising a slide (70) sliding along guides (71) fixed on at least one of the end frames (5) of the articulated chain of the lower half-mould (3), and a buffer head (75) provided on said slide and acting against the end of a wall ($P_1$) of a panel robe manufactured following the positioning of the slide along the guides.

20. Mould according to claim 19, wherein the buffer head (75) is supported by a pair of oscillating arms (74) so as to be movable with respect to the slide between a rear non-operative position and an advanced operative position.

21. Mould according to claim 20, comprising a lever system (80–84) for taking up the play of a cross-piece (76) on which the oscillating arms (74) are mounted.

* * * * *